US006482527B1

(12) United States Patent
Shrout et al.

(10) Patent No.: US 6,482,527 B1
(45) Date of Patent: Nov. 19, 2002

(54) PYROCHLORE THIN FILMS AND PROCESS FOR MAKING

(75) Inventors: Thomas R. Shrout, Port Matilda, PA (US); Susan Trolier-McKinstry, State College, PA (US); Clive A. Randall, State College, PA (US); Wei Ren, Kingston (CA); Ryan Thayer, State College, PA (US); Nathanael Bennink, Garland, TX (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/699,028

(22) Filed: Oct. 27, 2000

Related U.S. Application Data
(60) Provisional application No. 60/162,013, filed on Oct. 27, 1999, and provisional application No. 60/186,698, filed on Mar. 3, 2000.

(51) Int. Cl.$^7$ .......................... C04B 35/48; C04B 16/30; B32B 9/00
(52) U.S. Cl. ...................... 428/469; 428/697; 428/699; 428/701; 428/702; 428/213; 501/134; 423/593; 427/255.33; 427/255.395; 204/192.1
(58) Field of Search .................. 428/450, 469, 428/697, 699, 701, 702, 213; 501/134; 423/593, 617; 427/255.33, 255.395; 204/192.1

(56) References Cited

U.S. PATENT DOCUMENTS

| 4,638,401 A | * | 1/1987 | Ling et al. ............ 361/321 |
| 5,449,652 A | | 9/1995 | Swartz et al. ......... 501/134 |

FOREIGN PATENT DOCUMENTS

| JP | 405147933 A | * | 6/1993 |
| JP | 408236703 A | * | 9/1996 |

OTHER PUBLICATIONS

Yan et al. "Low–Firing, Temperature–Stable Dielectric Compositions Based on Bismuth Nickel Zinc Niobates." J. Am. Ceram. Soc. 73 (4) 1106–107 (1990). No Month.

Liu et al. "Phase Structure and Dielectric Properties of $Bi_2O_3$–ZnO–$Nb_2O_5$–Based Dielectric Ceramics." J. Am. Ceram. Soc. 76 (8) 2129–32 (1993). No Month.

Cann et al. "Investigation of the Dielectric Properties of Bismuth Pyrochlores." Solid State Communications. vol. 100 (7) 529–34 (1996). No Month.

Wang et al. "Structures, Phase Transformations, and Dielectric Properties of Pyrochlores Containing Bismuth." J. Am. Ceram. Soc. vol. 80 (10) 2745–8 (1997). No Month.

Kagata et al. "Low–Fire Bismuth–Based Dielectric Ceramics for Microwave Use." Jpn. J. Appl. Phys. vol. 31 (1992) Pt. 1, No. 9B. No Month.

Cheng et al. "Frequency Response of Microwave Diecectric $Bi_2(Zn_{1/3}Nb_{2/3})_2O_7$ Thin Films Laser Deposited on Indium—Tin Oxide Coated Glass." J. Appl. Phys. vol. 87 (1) pp. 479–483. No Date.

* cited by examiner

Primary Examiner—Deborah Jones
Assistant Examiner—Stephen Stein
(74) Attorney, Agent, or Firm—Ohlandt, Greeley, Ruggiero & Perle, L.L.P.

(57) ABSTRACT

A thin film comprising a pyrochlore represented by the formula:

$$(Bi_{3x}Zn_{2-3x})(Zn_xNb_{2-x})O_7$$

wherein x is from about 0.45 to about 0.73 and an article comprising a substrate and, coated on the substrate, a thin film of the pyrochlore are provided. Also provided is a process for depositing on a substrate the above pyrochlore thin film. The process includes the steps of coating the substrate with a composition comprising bismuth carboxylate, zinc carboxylate, niobium alkoxide, an organic solvent, an organic acid and an organic base, heating to remove organic components and annealing at a temperature and for a length of time sufficient to produce the pyrochlore thin film on the substrate.

40 Claims, 18 Drawing Sheets

PYROCHLORE THIN FILMS AND PROCESS FOR MAKING

This application claims priority from Provisional Applications Serial No. 60/162,013 filed on Oct. 27, 1999 and 60/186,698 filed on Mar. 3, 2000.

BACKGROUND OF THE INVENTION

1. Field of the Invention

The present invention relates to a bismuth-zirc-niobnate pyrochlore thin film, abbreviated as "BZN," represented by the formula:

$$(Bi_{3x}Zn_{2-3x})(Zn_xNb_{2-x})O_7$$

wherein x is fro m about 0.45 to about 0.73. More particularly, the present invention relates to a process of preparation of such thin films and coated articles that are suitable for use in dielectric applications.

2. Description of the Prior Art

The rapid development of communication technologies, especially mobile communication systems, has been greatly facilitated by miniaturization of devices used in such systems. Integrated decoupling capacitors and microwave resonators are of particular usefulness in such systems. Dielectric materials for these applications must possess a moderate to large dielectric constant, low loss tangent (tan δ), high dielectric quality factor Q (Q is equal to 1/tan δ), and a small temperature coefficient of resonator frequency (for resonators). $Bi_2O_3$—ZnO—$Nb_2O_5$ (BZN) pyrochlore ceramics have previously been developed for low firing temperature multilayer capacitors. These are described in M. F. Yan, H. C. Ling, and W. W. Rhodes, J. Am. Ceram. Soc., 73, 1106 (1990), D. Liu, Y. Liu, S. Huang, and X. Yao, J. Am. Ceram. Soc., 76, 2129 (1993), D. P. Cann, C. A. Randall, and T. R. Shrout, Solid State Comm., 100, 529 (1996) and X. Wang, H. Wang, and X. Yao, J. Am. Ceram. Soc., 80, 2745 (1997).

Recent studies by H. Kagata, T. Inoue, J. Kato, and I. Kameyama, Jpn. J. Appl. Phys., 31, 3152 (1992) and S. L. Swartz, and T. R. Shrout, U.S. Pat. No. 5,449,652 (1995) have shown that some compositions of the BZN class also exhibit excellent microwave properties. BZN ceramics with dielectric constants temperature coefficient of resonant frequency $|T_f|$<10 ppm/° C. and microwave Qf>5000 GHz have been reported by S. L. Swartz, and T. R. Shrout, U.S. Pat. No. 5,449,652 (1995). Such dielectric properties exhibited by the above BZN system indicate that thin films of this composition may have utility as potential materials for integrated microwave resonators and decoupling capacitors. Thin films may have the advantage of lower crystallization temperatures and smaller device size than bulk ceramics and may be potentially integrated in microelectronic devices.

Fabrication of thin films using Metal Organic Deposition (MOD) techniques have been previously used to deposit dielectric and ferroelectric thin films.

H. -F. Cheng, Y. -C. Chen, and I. -N. Lin, J. Appl. Phys., 87,479–483 (2000) have recently reported $Bi_2(Zn_{1/3}Nb_{2/3})_2O_7$ thin films on indium-tin oxide coated glass, deposited by a pulsed laser deposition technique. However, the films prepared by this method have unexpectedly high dielectric constants of up to about 300 and loss tangents of about 2%.

SUMMARY OF THE INVENTION

The present invention includes a thin film comprising a pyrochlore represented by the formula:

$$(Bi_{3x}Zn_{2-3x})(Zn_xNb_{2-x})O_7$$

wherein x is from about 0.45 to about 0.73.

The present invention flrter includes an article comprising a substrate and a thin film comprising a pyrochlore according to the present invention coated on the substrate.

The present invention also includes a process for depositing on a substrate a thin film comprising a pyrochlore represented by the formula:

$$(Bi_{3x}Zn_{2-3x})(Zn_xNb_{2-x})O_7$$

wherein x is from about 0.5 to about ⅔. The process comprises coating the substrate with a precursor composition comprising a bismuth containing metal organic compound, a zinc containing metal organic compound and a niobium containing metal organic compound, an organic solvent, an organic acid and an organic base, heating to remove organic components and annealing at a temperature and for a length of time sufficient to produce the pyrochlore thin film on the substrate.

The present invention further includes a method of depositing on a substrate a thin film comprising a pyrochlore represented by the formula:

$$(Bi_{3x}Zn_{2-3x})(Zn_xNb_{2-x})O_7$$

wherein x is from about 0.45 to about 0.73. The method comprises using a low temperature process comprising a step selected from the group consisting of: sputtering, applying a pulsed laser and depositing by MOCVD (Metal Organic Chemical Vapor Deposition), wherein the step is carried out under conditions sufficient to produce the pyrochlore thin film on the substrate.

The thin films comprising a pyrochlore according to the present invention have properties that include relatively large dielectric constants, small loss tangents, controllable temperature coefficients of capacitance, electric field tunability of the dielectric constant and dispersion of the relative permittivity. These properties make the thin films of the present invention particularly suitable for use in dielectric applications, such as, capacitive components and decoupling capacitors as well as in microwave applications, such as, integrated microwave components. In addition, the process and method of the present invention provide low processing temperatures, precise composition control, uniform deposition over large area substrates and low cost.

DETAILED DESCRIPTION OF INVENTION

Figure 1:
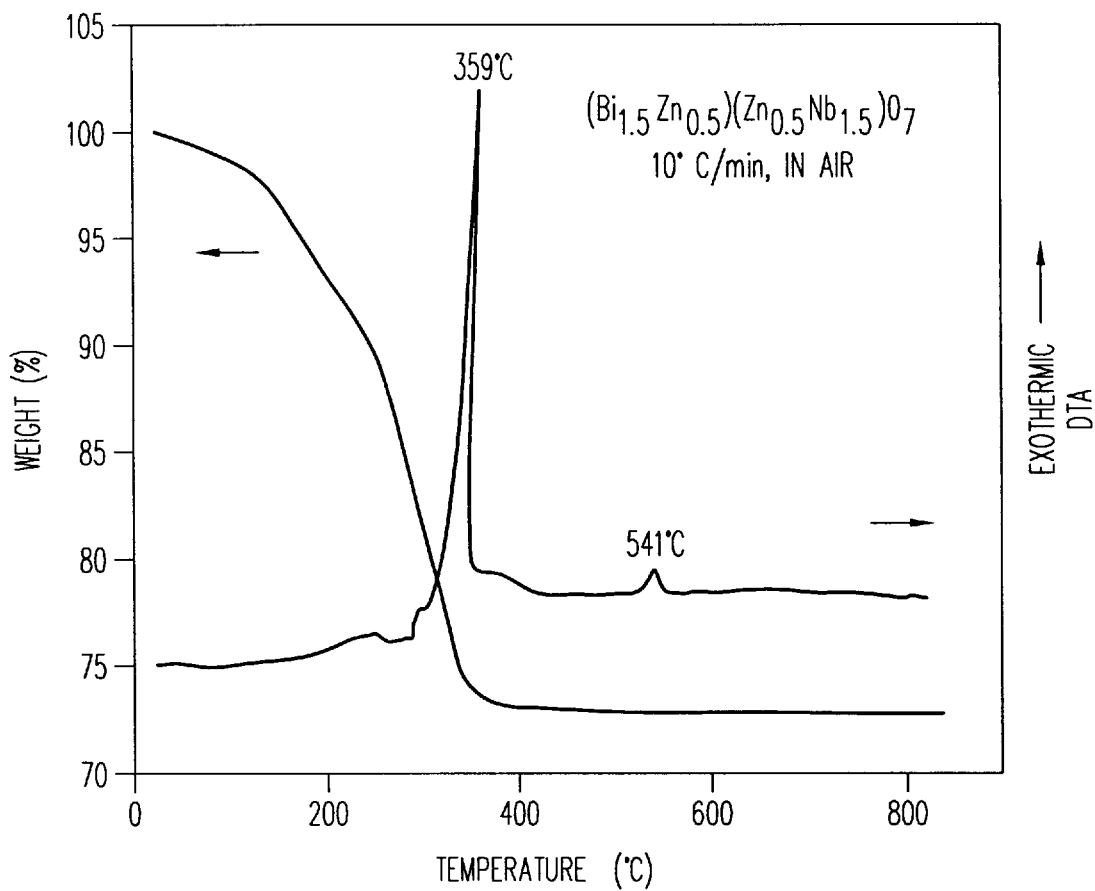
FIG. 1 depicts the TGA/DTA curves of the BZN gels.

Two compositions of prochlore thin films $(Bi_{1.5}Zn_{0.5})(Zn_{0.5}Nb_{1.5})O_7$ and $Bi_2(Zn_{1/3}Nb_{2/3})_2O_7$ were prepared for testing. These two compositions are members of the general family $(Bi_{3x}Zn_{2-3x})(Zn_xNb_{2-x})O_7$, with x=0.5 and x=⅔, respectively.

The pyrochlore thin films of the present invention are represented by the formula:

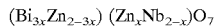

$(Bi_{3x}Zn_{2-3x})(Zn_xNb_{2-x})O_7$ wherein x is from about 0.5 to about ⅔. Preferred compositions include $(Bi_{1.5}Zn_{0.5})(Zn_{0.5}Nb_{1.5})O_7$ and $Bi_2(Zn_{1/3}Nb_{2/3})_2O_7$.

Preferably, the pyrochlore thin films of the present invention have high field tunability.

Pyrochlore thin films were prepared on platinum coated silicon wafers using a Metal Organic Deposition process (MOD). Films having two distinct compositions, $(Bi_{1.5}Zn_{0.5})(Zn_{0.5}Nb_{1.5})O_7$ and $Bi_2(Zn_{1/3}Nb_{2/3})_2O_7$ and were prepared an their structure, morphology and dielectric properties were investigated. Thin films of $(Bi_{1.5}Zn_{0.5})(Zn_{0.5}Nb_{1.5})O_7$ had a cubic pyrochlore phase when crystallized at 550° C. or higher. The crystal structure of $Bi_2(Zn_{1/3}Nb_{2/3})_2O_7$ thin films was dependent on the firing temperature showing a cubic pyrochlore phase at temperatures below 650° C. and a pseudo-orthorhombic pyrochlore structure at 750° C. A mixture of cubic and pseudo-orthorhombic structures was found in thin films crystallized at 700° C.

$(Bi_{1.5}Zn_{0.5})(Zn_{0.5}Nb_{1.5})O_7$ films fired at 750° C. had a dielectric constant of about 150 and a negative temperature coefficient of capacitance of −400 ppm/° C. $Bi_2(Zn_{1/3}Nb_{2/3})_2O_7$ thin films fired at 750° C. had a smaller dielectric constant of about 80 and a positive temperature coefficient of capacitance of 150 ppm/° C.

The dielectric constants of the thin films were composition, structure and firing temperature dependent. The loss tangents of both types of films were smaller than 0.008. Bias voltage dependence of dielectric constant showed that the cubic $(Bi_{1.5}Zn_{0.5})(Zn_{0.5}Nb_{1.5})O_7$ films fired at 750° C. were tunable, while the pseudo-orthorhombic $Bi_2(Zn_{1/3}Nb_{2/3})_2O_7$ films were nearly field independent.

The $(Bi_{1.5}Zn_{0.5})(Zn_{0.5}Nb_{1.5})O_7$ films fired at 750° C. have a dielectric constant of 150 and a negative TCC (Temperature Coefficient of Capacitance). $Bi_2(Zn_{1/3}Nb_{2/3})_2O_7$ thin films fired at 750° C. had a smaller dielectric constant of about 80 and a positive TCC (Temperature Coefficient of Capacitance). Loss tangents of both types of BZN films are below 0.008 at 10 kHz. The cubic $(Bi_{1.5}Zn_{0.5})(Zn_{0.5}Nb_{1.5})O_7$ films fired at 750° C. had a large tunability. The cubic BZN's showed strong frequency dispersion in the dielectric responses at low temperature, which had glassy characteristics similar to spin glasses. Strong evidence suggests that the correlation between dipole clusters in the cubic BZN was very weak in the temperature range investigated. Even under field cooled conditions, the dipole clusters can not establish a long-range ordering at 4.2 K.

As defined herein, a thin film has a thickness that is not more than about 10 μm. Preferably, the thin film comprising a pyrochlore according to the present invention has a thickness from about 0.01 to about 10 μm, more preferably from about 0.03 to about 1.5 μm, and most preferably from about 0.05 to about 0.5 μm.

The pyrochlore thin film according to the present invention can have a cubic or pseudo-orthorombic phase or a combination thereof Preferably, the dielectric constant of the pyrochlore thin film is from about 50 to about 250, more preferably from 70 to about 180. Preferably, the loss tangent is less than about 0.01, more preferably less than about 0.006 at 10 kHz. Preferably, the temperature coefficient of capacitance is from about +300 to about −600 ppm/° C., more preferably from about +150 to about −400 ppm/° C.

Referring to FIG. 1, the TGA (Thermal Gravimetric Analysis) and DTA (Differential Thermal Analysis) curves of the BZN gels are shown. The TGA curve indicates that the main weight loss started at about 250° C. and decomposition of the BZN gels was completed at about 400° C., with a total weight loss of 27%. Only 0.37% additional weight loss was found between 400° C. and 850° C. A maximum of 1.5 mole % of bismuth loss might be possible assuming that all of the high temperature weight loss is caused by volatilization of bismuth. This suggests that bismuth loss in BZN was not severe at firing temperatures below 850° C.

The DTA curve shows two exothermic peaks at 360° C. and 540° C. respectively. The first exothermic peak at 360° C. (which was accompanied by a large weight loss) was associated with the decomposition of most of the organics. The second exothermic peak at 540° C. without any additional weight loss was attributed to crystallization of the BZN. This was confirmed by X-ray diffraction studies on BZN films.

Figure 2:
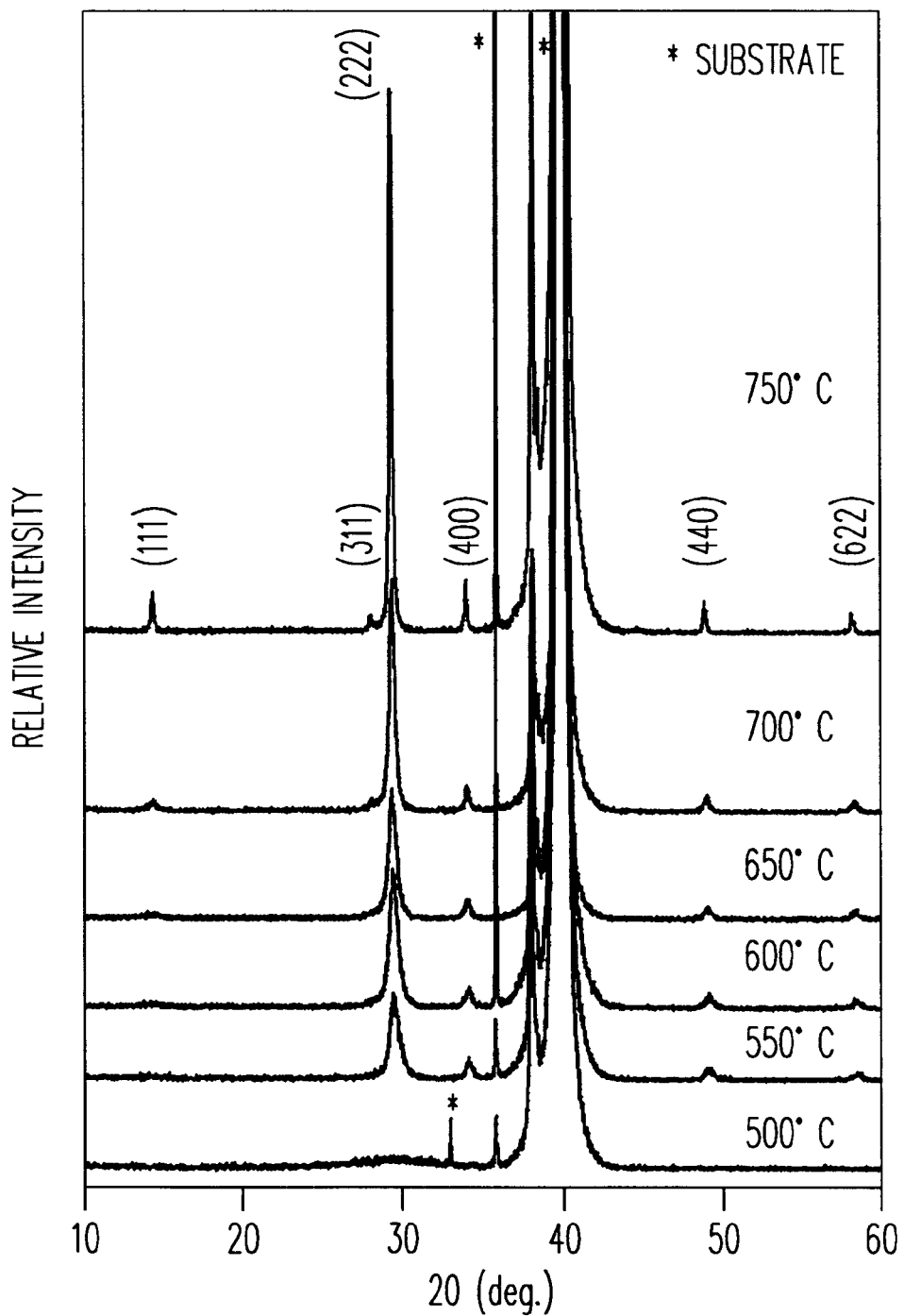
FIG. 2 depicts the XRD (X-Ray Diffraction) patterns of $(Bi_{1.5}Zn_{0.5})(Zn_{0.5}Nb_{1.5})O_7$ films fired at different temperatures. The asterisks indicates substrate peaks.

The XRD (X-Ray Diffraction) patterns of $(Bi_{1.5}Zn_{0.5})(Zn_{0.5}Nb_{1.5})O_7$ films fired at different temperatures are shown in FIG. 2. The films were amorphous at temperatures of 500° C. and below; no sharp diffraction peaks were observed in the films. Films fired at 550° C. were crystalline and showed a cubic pyrochlore structure. With increasing firing temperature, the intensities of the diffraction peaks strengthened, but the films maintained the cubic pyrochlore structure. No strong preferred orientation was found in the films. The lattice constant calculated from the films fired at 750° C. is 1.055 nm, which is close to the bulk value.

Figure 3:
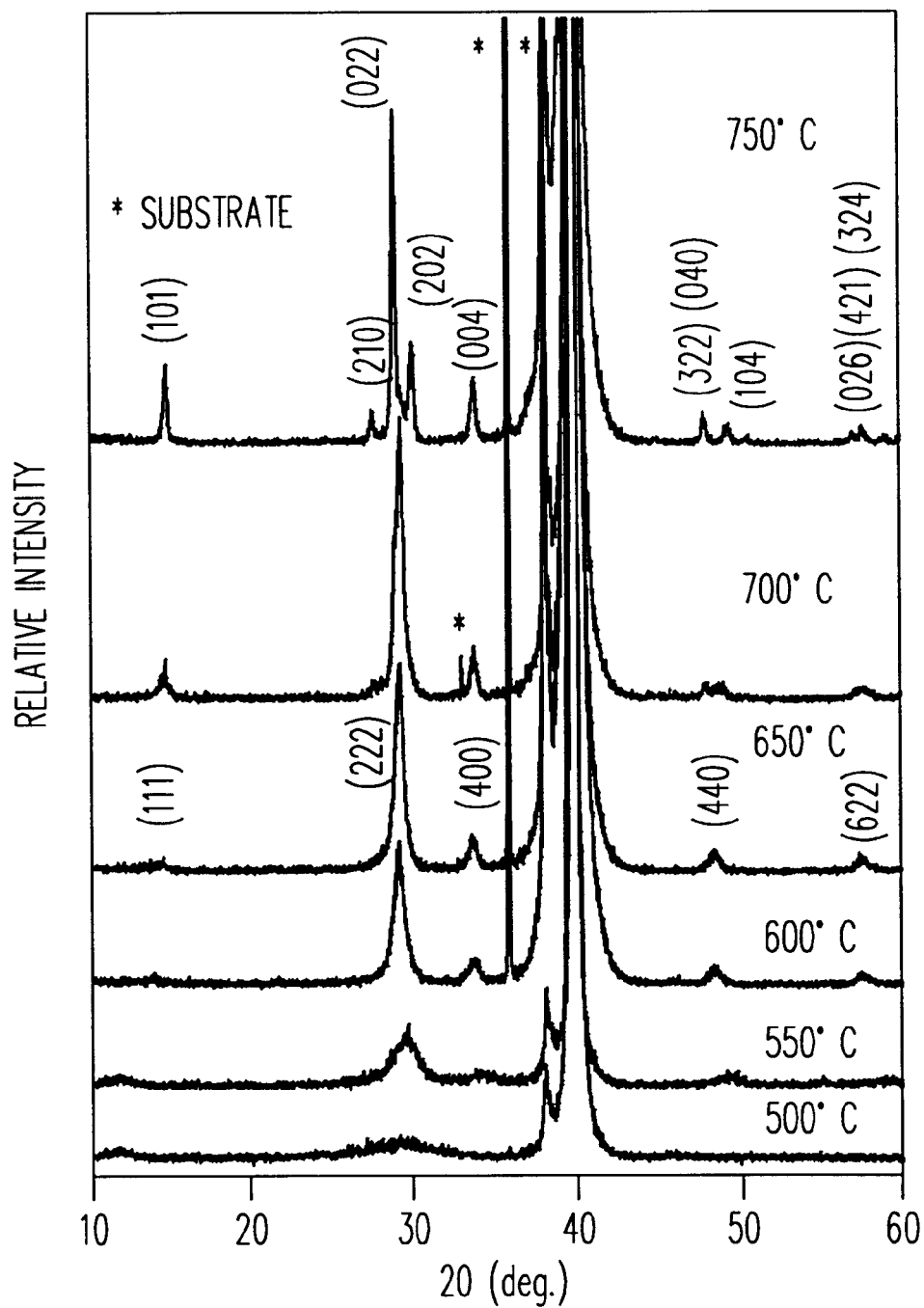
FIG. 3 depicts the XRD (X-Ray Diffraction) patterns of $Bi_2(Zn_{1/3}Nb_{2/3})_2O_7$ films fired at different temperatures. The asterisks indicates substrate peaks.
Figure 4A:
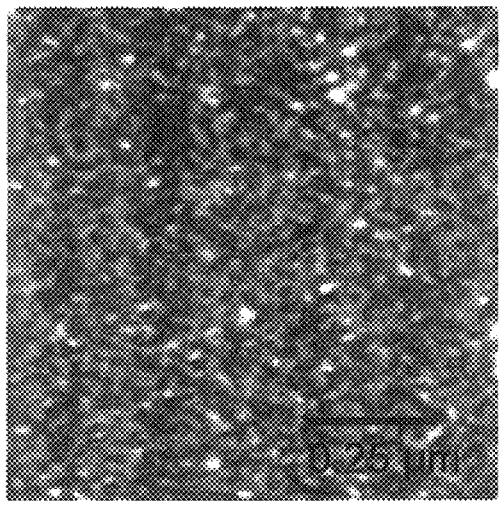
FIG. 4 shows the Atomic Force Microscope (AFM) results for $Bi_2(Zn_{1/3}Nb_{2/3})_2O_7$ films fired at 550–750° C. The firing temperatures were 550° C. in (a), 650° C. in (b), 700° C. in (c) and 750° C. in (d).
Figure 4B:
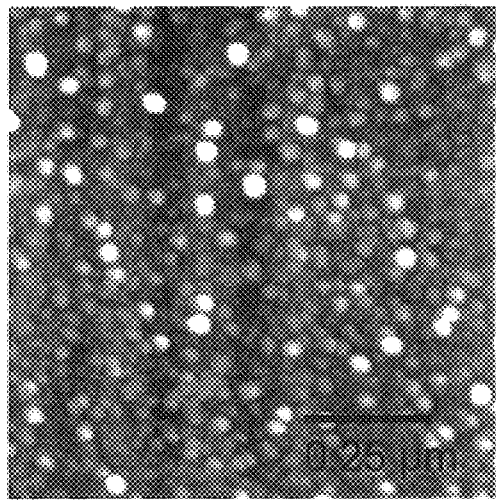
Figure 4C:
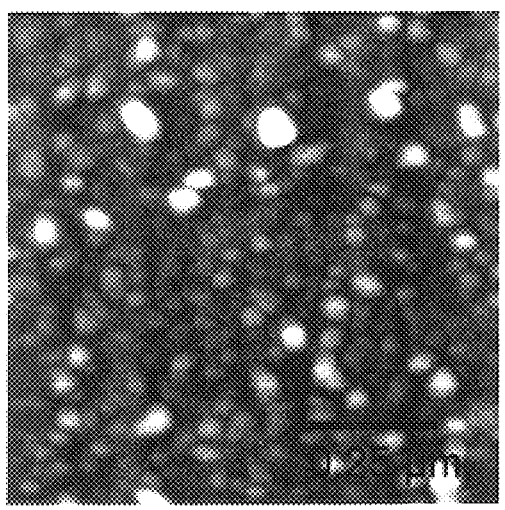
Figure 4D:
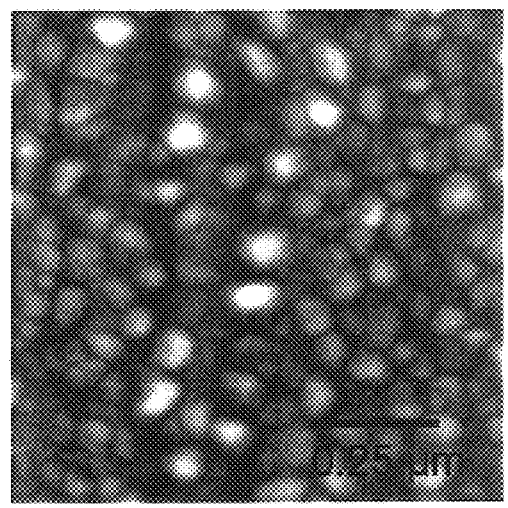

FIG. 3 gives the XRD (X-Ray Diffraction) patterns of $Bi_2(Zn_{1/3}Nb_{2/3})_2O_7$ films fired at different temperatures.

After the 500° C. anneal, the film was amorphous. Between 550° C. and 650° C., the films appeared to have a cubic structure with a main peak (222) at 2θ=29.3°. For the film fired at 750° C., the diffraction pattern was found to be comparable to conventional bulk ceramic. The film can be indexed to a pseudo-orthorhombic phase with lattice constants of a=0.718 nm, b=0.759 nm, and c=1.058 nm. The XRD (X-Ray Diffraction) pattern showed the films still maintained a pseudo-orthorhombic structure even when fired to 800° C.; no cubic phase was detected. A mixture of cubic and pseudo-orthorhombic structures was observed in films fired at 700° C.

The phase evolution in the BZN thin films was found to be different from that of bulk ceramics. In bulk ceramics prepared by mixed oxide route, $Bi_2O_3$ and $Nb_2O_5$ reacted first to form two kinds of $Bi_2O_3$—$Nb_2O_5$ compounds. These are then reacted with ZnO. A mixture of a pseudo-orthorhombic and cubic structures was formed at intermediate temperatures. At higher sintering temperatures, the cubic phase in $Bi_2(Zn_{1/3}Nb_{2/3})_2O_7$ converted into the pseudo-orthorhombic phase, while for $(Bi_{1.5}Zn_{0.5})(Zn_{0.5}Nb_{1.5})O_7$ the pseudo-orthorhombic phase transformed to the cubic phase. In thin films on the other hand, the cubic pyrochlore structure was directly formed at low firing temperatures for both compositions. No pseudo-orthorhombic phase was ever observed in $(Bi_{1.5}Zn_{0.5})(Zn_{0.5}Nb_{1.5})O_7$ films over the temperature range investigated. The cubic phase in $Bi_2(Zn_{1/3}Nb_{2/3})_2O_7$ films transformed to the pseudo-orthorhombic phase at higher firing temperatures. Single phase pseudo-orthorhombic $Bi_2(Zn_{1/3}Nb_{2/3})_2O_7$ films were obtained at 750° C. The difference in phase evolution between the previous reports on bulk materials and the films prepared here is probably due in part to the better homogeneity of the MOD (Metal Organic Deposition) precursors. It is also possible that the bottom electrodes may play an important role in the phase formation sequence of the BZN thin films.

FIG. 4 shows results obtained for $Bi_2(Zn_{1/3}Nb_{2/3})_2O_7$ films fired at 550–750° C. The firing temperatures were 550° C. in (a), 650° C. in (b), 700° C. in (c) and 750° C. in (d). The surface morphologies of the BZN thin films were determined. Atomic Force Microscope (AFM) micrographs were collected in tapping mode. Featureless Atomic Force Microscope (AFM) photos were found in the BZN films fired at 500° C., which were amorphous as indicated by XRD (X-Ray Diffraction). Referring to FIG. 4, it can be seen that when the temperature was increased to 550° C., very fine grains with a surface grain size of about 30 nm were observed in the films. The surface grain sizes increased with firing temperature. At temperatures of 750° C., the grain size reached around 100 nm. The BZN films exhibited a dense microstructure with no cracks or defects.

Figure 5:
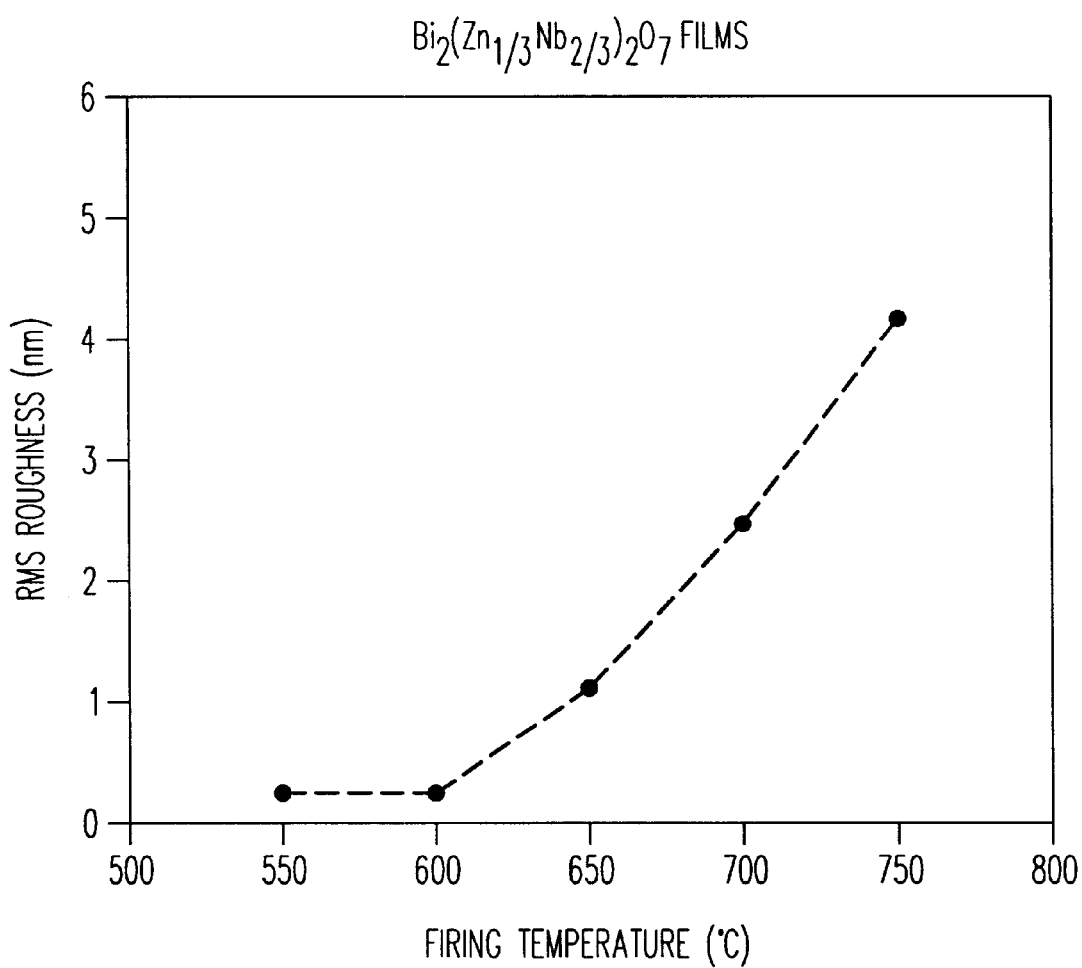
FIG. 5 shows very small surface roughness of the $Bi_2(Zn_{1/3}Nb_{2/3})_2O_7$ films calculated from the Atomic Force Microscope (AFM) images.

FIG. 5 shows that the surface roughness of the $Bi_2(Zn_{1/3}Nb_{2/3})_2O_7$ films calculated from the Atomic Force Microscope (AFM) data was very small. At a firing temperature of 550° C., the average roughness was only 0.4 nm. In this case, the root mean square (rms) roughness increased with temperature and was 4.2 nm at 750° C. The Atomic Force Microscope (AFM) micrographs of the $(Bi_{1.5}Zn_{0.5})(Zn_{0.5}Nb_{1.5})O_7$ films showed similar features.

Figure 6:
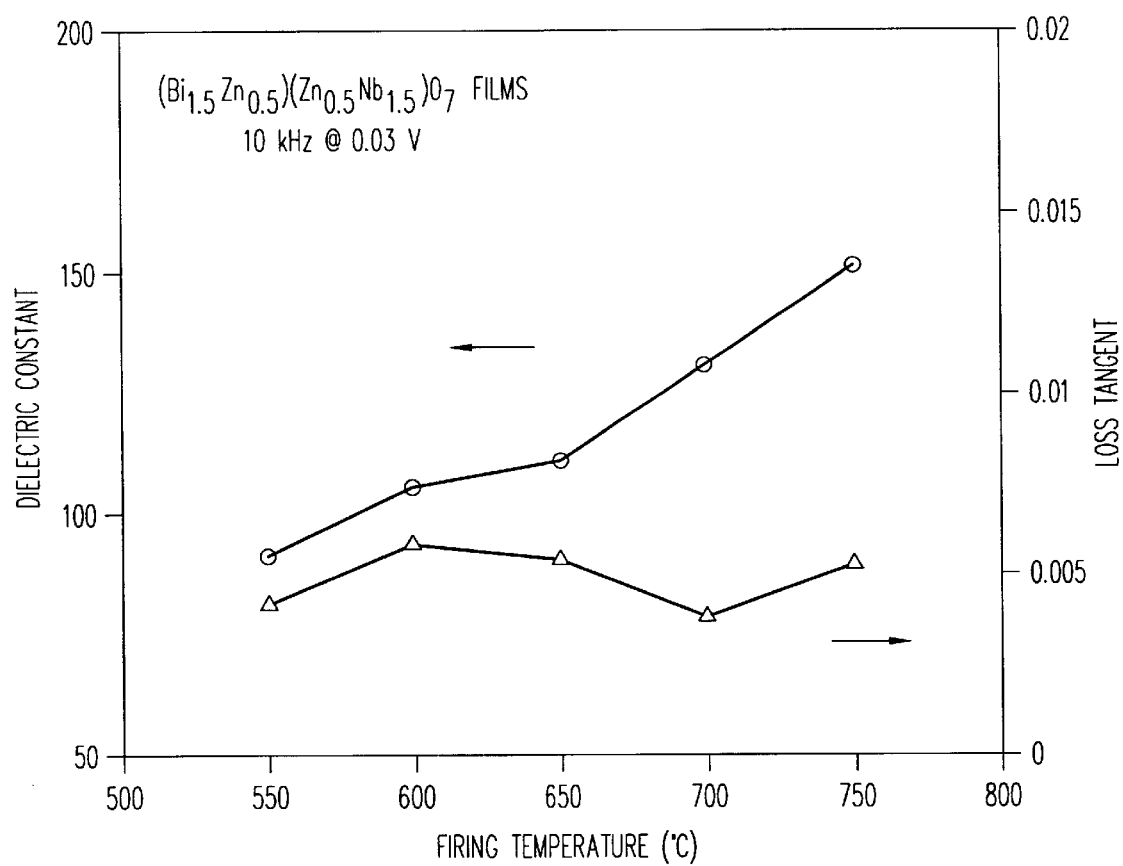
FIG. 6 shows the dielectric properties and loss tangents of $(Bi_{1.5}Zn_{0.5})(Zn_{0.5}Nb_{1.5})O_7$ films as a function of firing temperature.

FIG. 6 gives the dielectric properties of $(Bi_{1.5}Zn_{0.5})(Zn_{0.5}Nb_{1.5})O_7$ films as a function of firing temperature. The dielectric constants of the films increased monotonically with crystallization temperature and reached a value of 150 at 750° C., which was comparable to the values of bulk ceramics with the same composition (140–170). All films exhibited very low dielectric losses (loss tangent<0.008).

Figure 7:
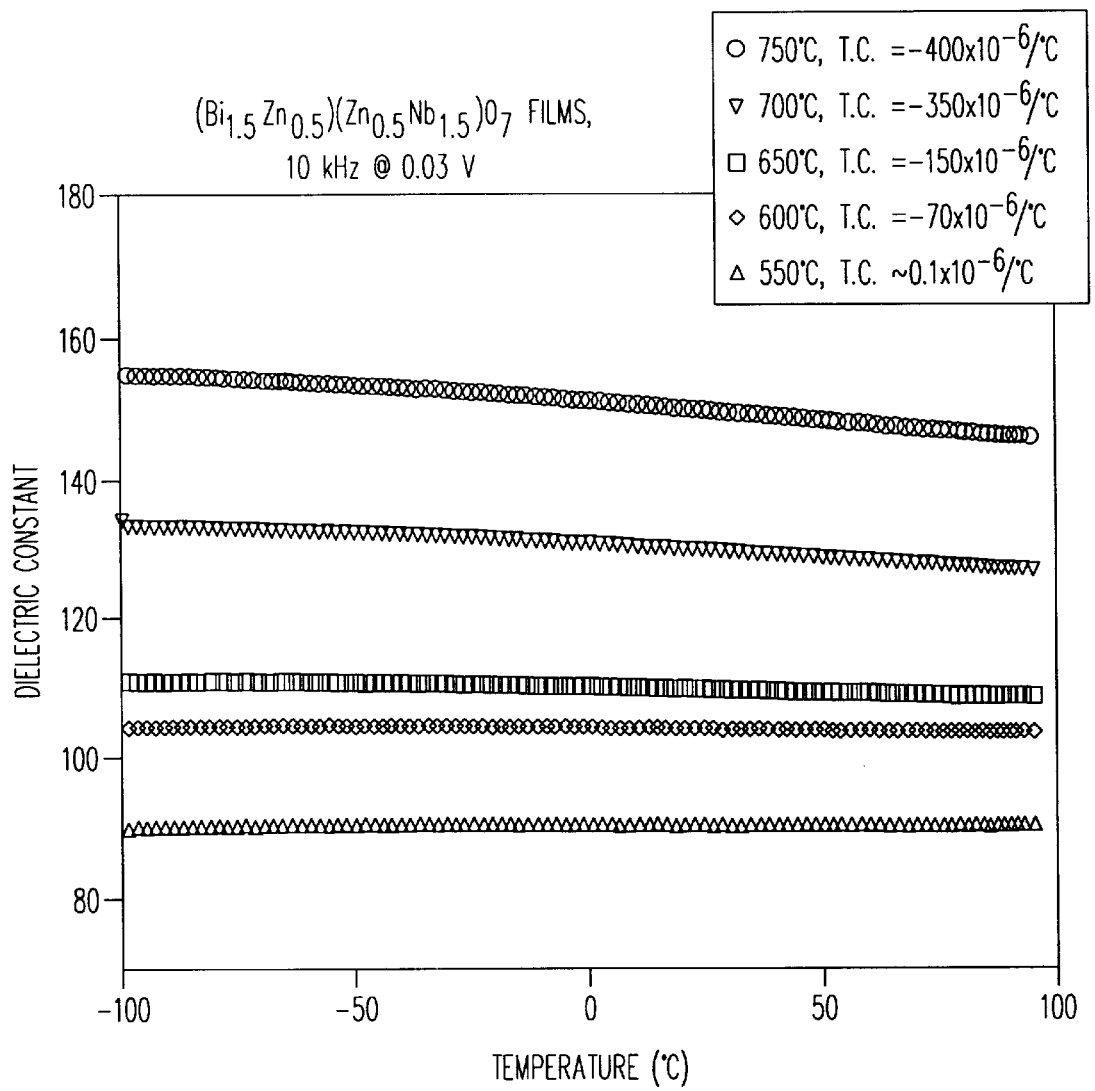
FIG. 7 illustrates the temperature dependence of the dielectric constant in the measuring temperature range −100 to 100° C.

FIG. 7 depicts the temperature dependence of the dielectric constant in the measuring temperature range −50 to 100° C. As can be seen from FIG. 7, the dielectric constants changed linearly with temperature over this range.

Figure 9:
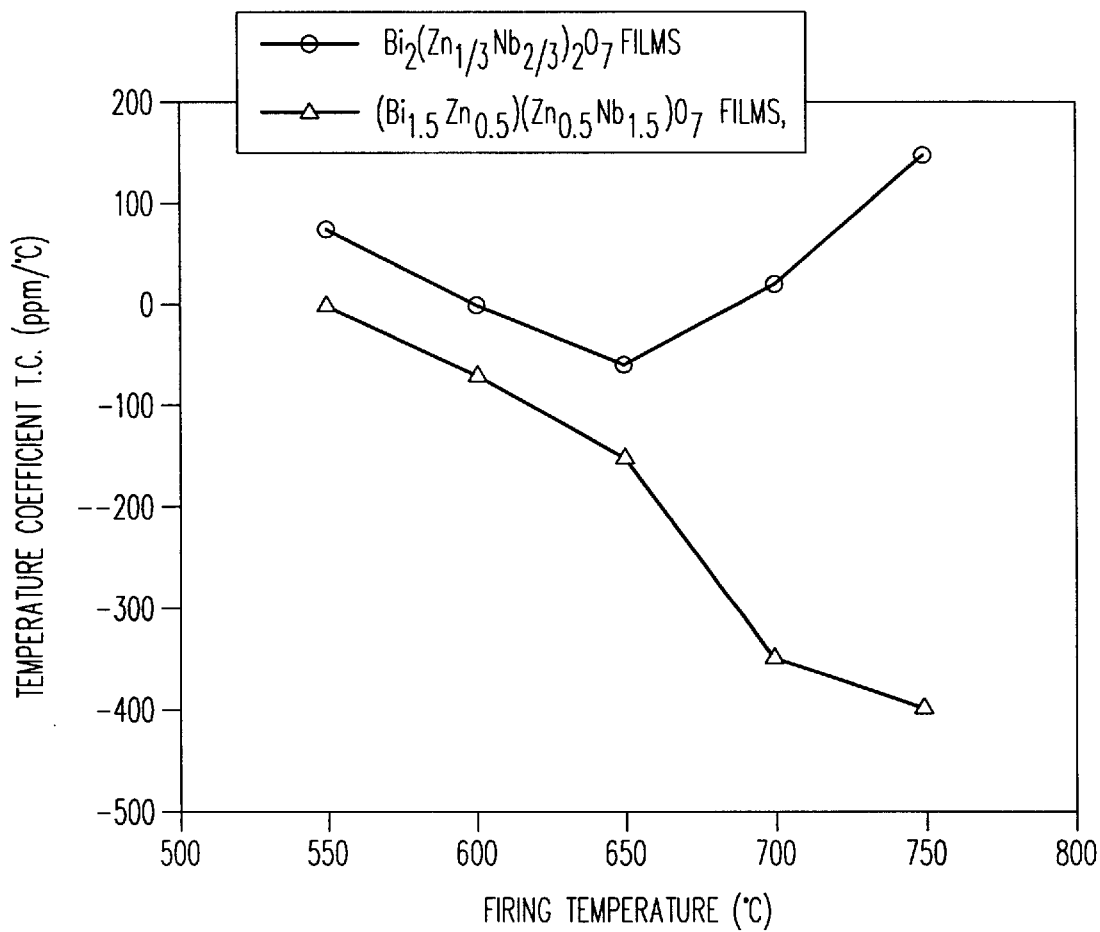
FIG. 9 shows the TCC (Temperature Coefficient of Capacitance) calculated from FIG. 6.

FIG. 9 shows the temperature coefficient of capacitance (TCC), which was calculated from FIG. 7 in terms of (C'−C)/C, where C and C' were the capacitance at −50° C. and 100° C. respectively. The TCC (Temperature Coefficient of Capacitance) of the films was also firing temperature dependent; it was −400 ppm/° C. for films fired at 750° C. and decreased towards zero at lower crystallization temperatures. The TCC (Temperature Coefficient of Capacitance) of the $(Bi_{1.5}Zn_{0.5})(Zn_{0.5}Nb_{1.5})O_7$ films fired at 750° C. was comparable to the values observed from conventional bulk ceramics.

It is seen from the dielectric properties of $Bi_2(Zn_{1/3}Nb_{2/3})_2O_7$ films versus firing temperature shown in FIG. 6 that the dielectric constant of the $Bi_2(Zn_{1/3}Nb_{2/3})_2O_7$ films is a function of firing temperature and has a maximum at 650° C. The dielectric constant at 750° C. was 82, which is comparable to conventional bulk values. The XRD (X-Ray Diffraction) indicated that $Bi_2(Zn_{1/3}Nb_{2/3})_2O_7$ films had a pseudo-orthorhombic pyrochlore phase at firing temperatures of 750° C. Based on the above results, we can conclude that dielectric constant of BZN films with a pseudo-orthorhombic phase is smaller than that of the films with a cubic phase. Because of the cubic phase formed in $Bi_2(Zn_{1/3}Nb_{2/3})_2O_7$ films at firing temperatures of 650–700° C., the dielectric constant shown in FIG. 6 increased with decreasing firing temperature. For firing temperatures of 600° C. and below the dielectric constant decreased due to weak crystallization of the films. The loss tangent of the films was lower than 0.008.

Figure 8:
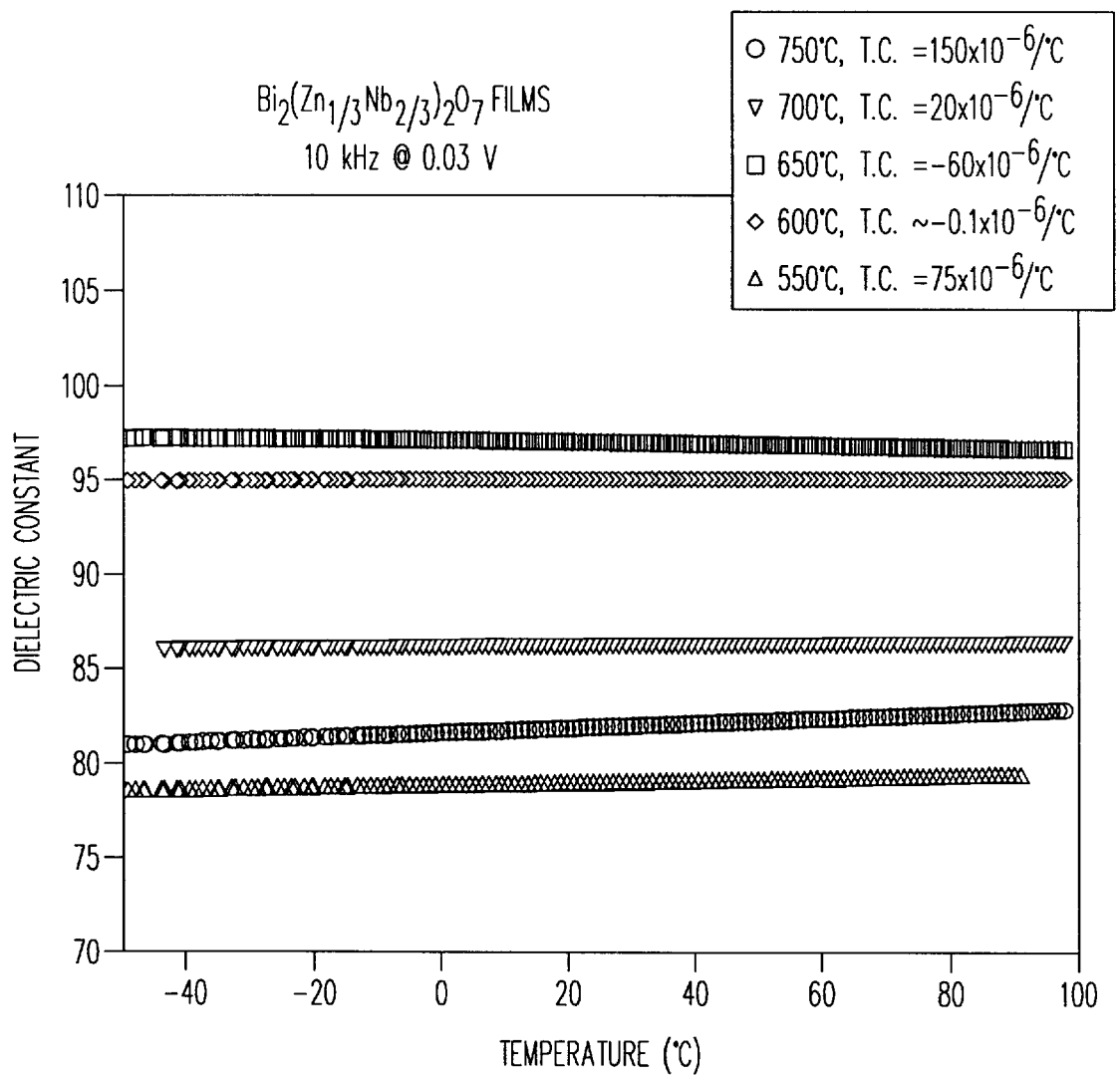
FIG. 8 illustrates the temperature dependence of the dielectric constant of the $Bi_2(Zn_{1/3}Nb_{2/3})_2O_7$ films.

The temperature dependence of dielectric constant of the $Bi_2(Zn_{1/3}Nb_{2/3})_2O_7$ films is shown in FIG. 8. The permittivity showed a good linear relationship in the measuring temperature range of −50 to 100° C.

The TCC (Temperature Coefficient of Capacitance) calculated from FIG. 8 is shown in FIG. 9. TCC (Temperature Coefficient of Capacitance) of the films fired at 750° C. was 150 ppm/° C., which was also comparable to conventional bulk values. It can be seen from FIG. 9 that at the same firing temperature of 750° C., the BZN films with a cubic phase had a negative TCC (Temperature Coefficient of Capacitance) (−400 ppm/° C.), while films with a pseudo-orthorhombic phase had a positive TCC (Temperature Coefficient of Capacitance) (150 ppm/° C.). As the firing temperature decreased from 750 to 650° C., the TCC (Temperature Coefficient of Capacitance) of $Bi_2(Zn_{1/3}Nb_{2/3})_2O_7$ films decreased due to the cubic phase formed at low temperatures. A mixture of cubic and pseudo-orthorhombic phases in $Bi_2(Zn_{1/3}Nb_{2/3})_2O_7$ films fired at 700° C. gives a very small TCC (Temperature Coefficient of Capacitance) (about 20 ppm/° C.).

Figure 10:
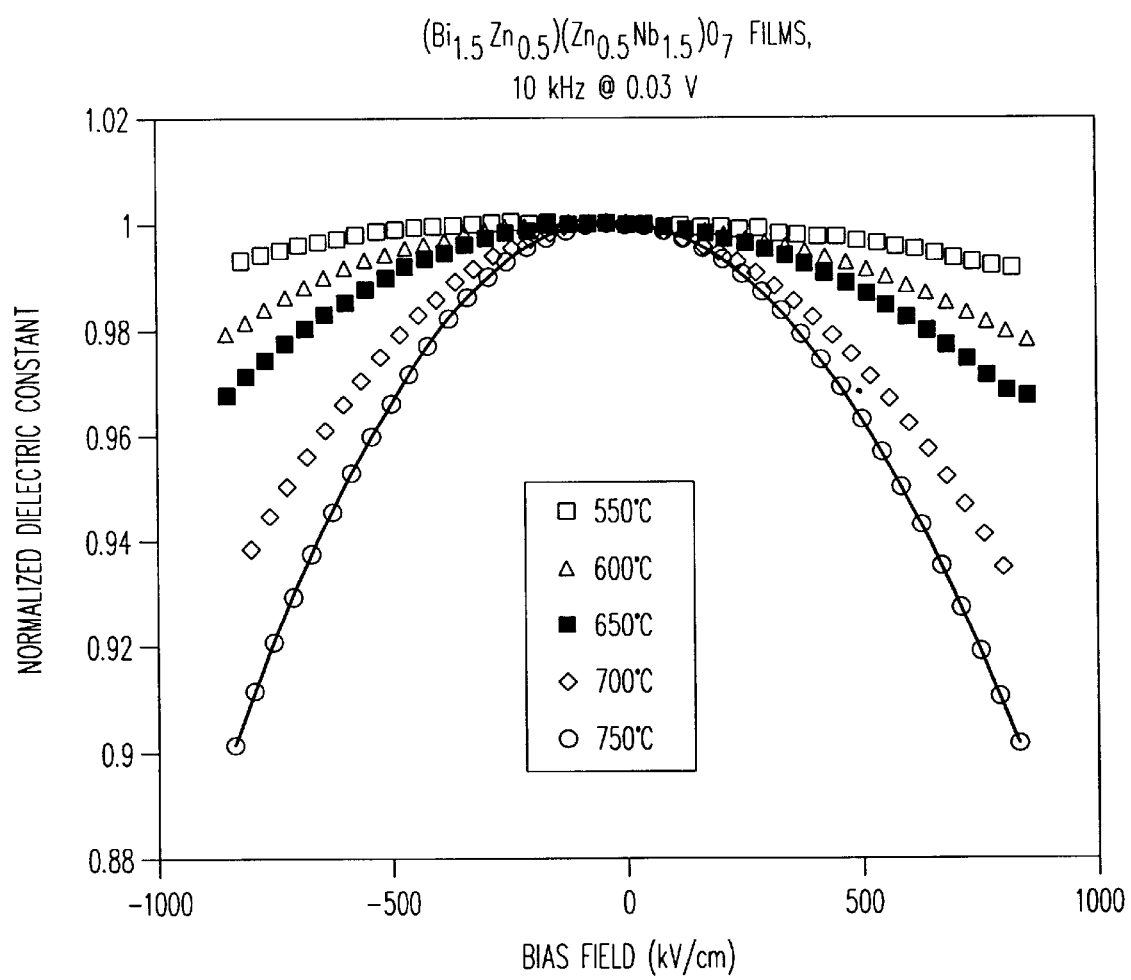
FIG. 10 depicts normalized dielectric constant versus bias field plots for $(Bi_{1.5}Zn_{0.5})(Zn_{0.5}Nb_{1.5})O_7$ films fired at different temperatures.

FIG. 10 depicts normalized dielectric constant versus bias field plots for $(Bi_{1.5}Zn_{0.5})(Zn_{0.5}Nb_{1.5})O_7$ films fired at different temperatures. The plot shows bias electric field dependence of the dielectric properties of the BZN films. The measuring frequency is 10 kHz. It can be seen that dielectric responses under the bias field are firing temperature dependent. For the cubic BZN films fired at 750° C., the dielectric constant decreased with the bias field, while the loss tangent was constant (not shown in the figure). The dielectric constant changed 10% under a bias of 830 kV/cm. The curve was symmetric with respect to zero-bias and had no hysteresis.

Figure 11:
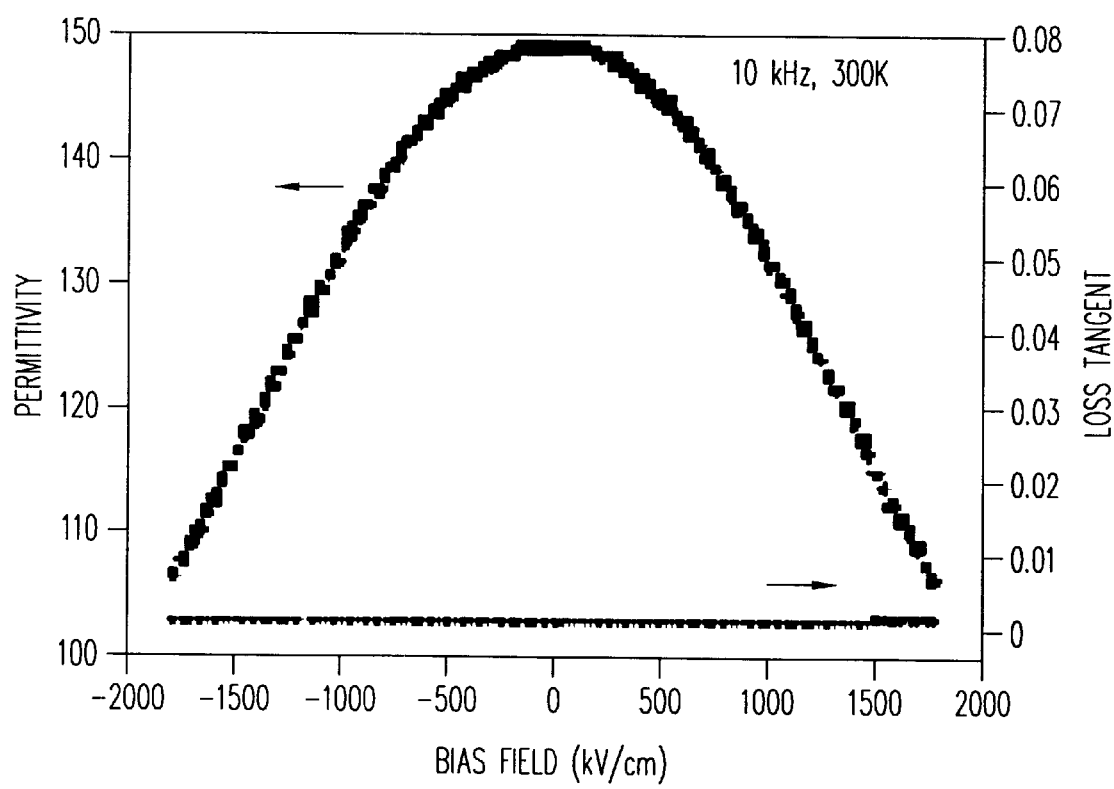
FIG. 11 shows higher field measurements at higher temperatures.

FIG. 11 shows higher field measurements at higher temperatures, i.e., room temperatures. 30% tunability was achieved. At liquid nitrogen temperatures, the dielectric constant can be tuned 40%.

The tunability of the cubic BZN films decreased with decreasing firing temperature. At a firing temperature of 550° C., the film was hard to tune by a bias field. The voltage variable dielectric constant makes cubic BZN thin film candidates for tunable components.

Figure 12:
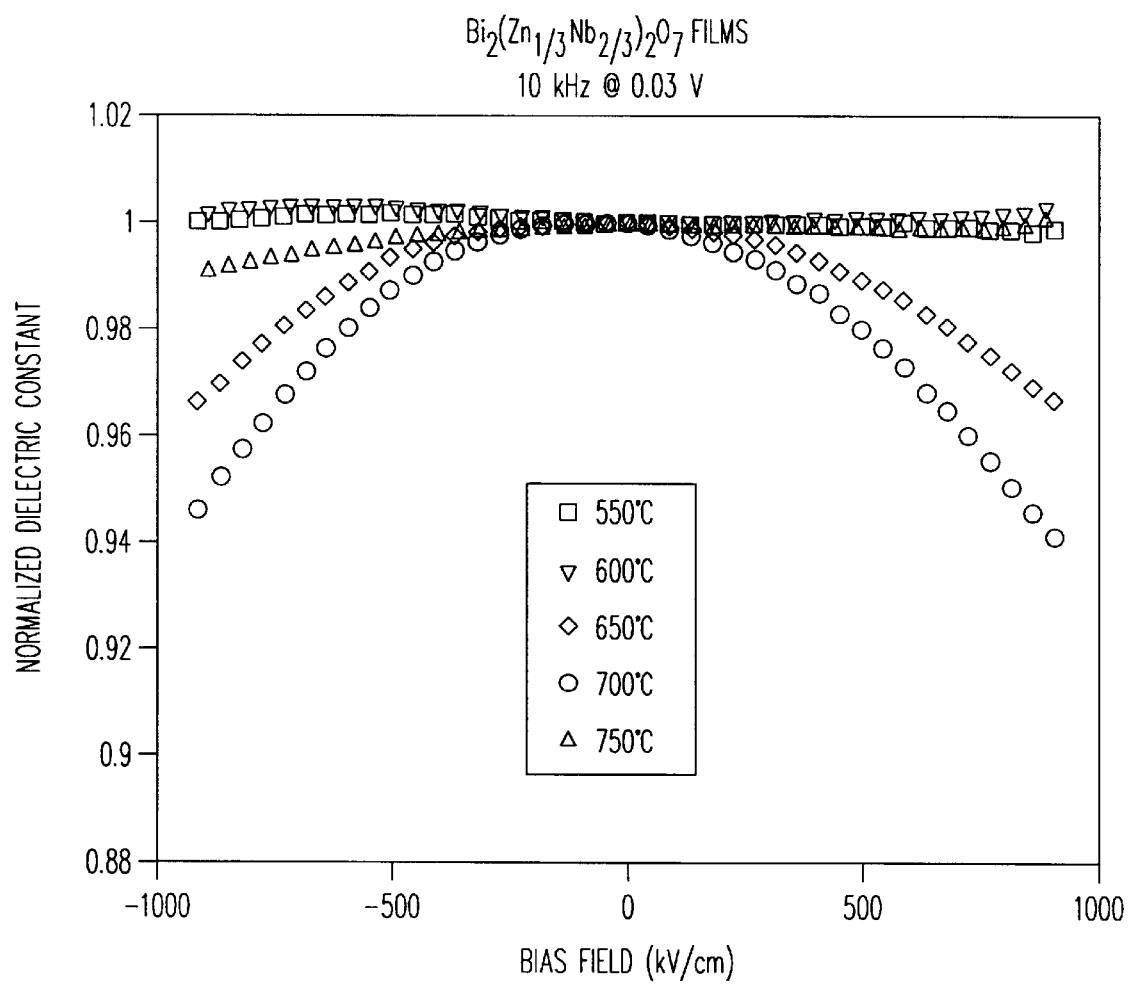
FIG. 12 depicts normalized dielectric constants as a function of bias field for $Bi_2(Zn_{1/3}Nb_{2/3})_2O_7$ films fired at different temperatures.

FIG. 12 shows normalized dielectric constants as a function of bias field for $Bi_2(Zn_{1/3}Nb_{2/3})_2O_7$ films fired at different temperatures. Unlike $(Bi_{1.5}Zn_{0.5})(Zn_{0.5}Nb_{1.5})O_7$ films, the dielectric constants of the $Bi_2(Zn_{1/3}Nb_{2/3})_2O_7$ films fired at 750° C. were almost constant for biases of $\leq 800$ kV/cm. For the $Bi_2(Zn_{1/3}Nb_{2/3})_2O_7$ films fired at 650° C. and 700° C., their dielectric constants can be tuned by a bias field. This tunability is attributed to the cubic phase existing in the $Bi_2(Zn_{1/3}Nb_{2/3})_2O_7$ films fired at lower temperatures. With larger applied fields, some tunability is evident.

The dielectric measurements demonstrate that the dielectric constants, TCC (Temperature Coefficient of Capacitance) and tunability of the BZN films depended not only on their composition, but also on the firing temperature and phase content. BZN films with the cubic pyrochlore phase have larger dielectric constants, negative TCC (Temperature Coefficient of Capacitance) values and larger tunability. Films with the pseudo-orthorhombic pyrochlore phase have smaller dielectric constants and positive TCC (Temperature Coefficient of Capacitance). The above results suggest that the dielectric properties of the BZN films can be tailored to a given application by adjusting composition, phase and firing temperature.

It was also found that the tunability in the cubic pyrochlore films was correlated with the presence of a low temperature dielectric relaxation. It has been demonstrated previously on bulk ceramics that many of the cubic bismuth pyrochlores showed evidence for a low temperature relaxation.

Figure 13A:
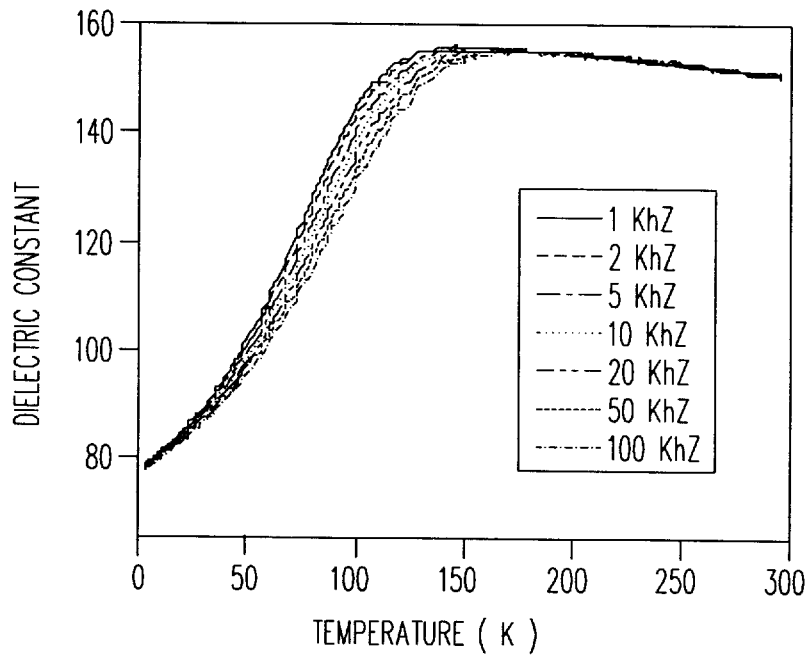
FIG. 13 depicts dielectric constant and loss of the $(Bi_{1.5}Zn_{0.5})(Zn_{0.5}Nb_{1.5})O_7$ films fired at 750° C. as a function of measuring temperature.
Figure 13B:
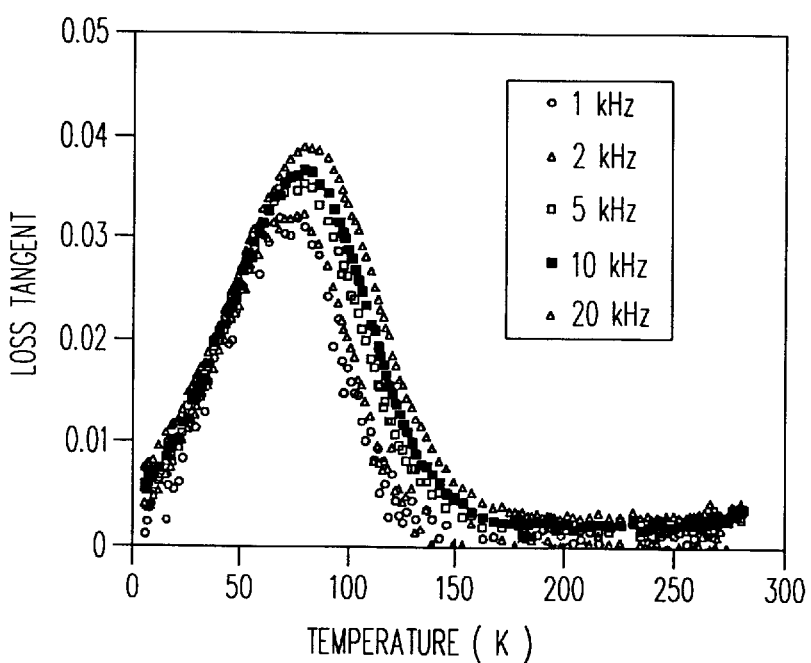

FIG. 13 gives dielectric constant and loss of the $(Bi_{1.5}Zn_{0.5})(Zn_{0.5}Nb_{1.5})O_7$ films fired at 750° C. as a function of measuring temperature. A frequency dispersion of the dielectric properties was observed where the permittivity value dropped by almost a factor of 50%. The maxima in the dielectric constant curves were found to decrease and shift to higher temperatures with increasing measuring frequency. The corresponding maxima of loss tangent increased and shifted to higher temperature with increasing frequency. For temperatures below 65 K, the loss tangent was basically frequency independent.

Figure 14:
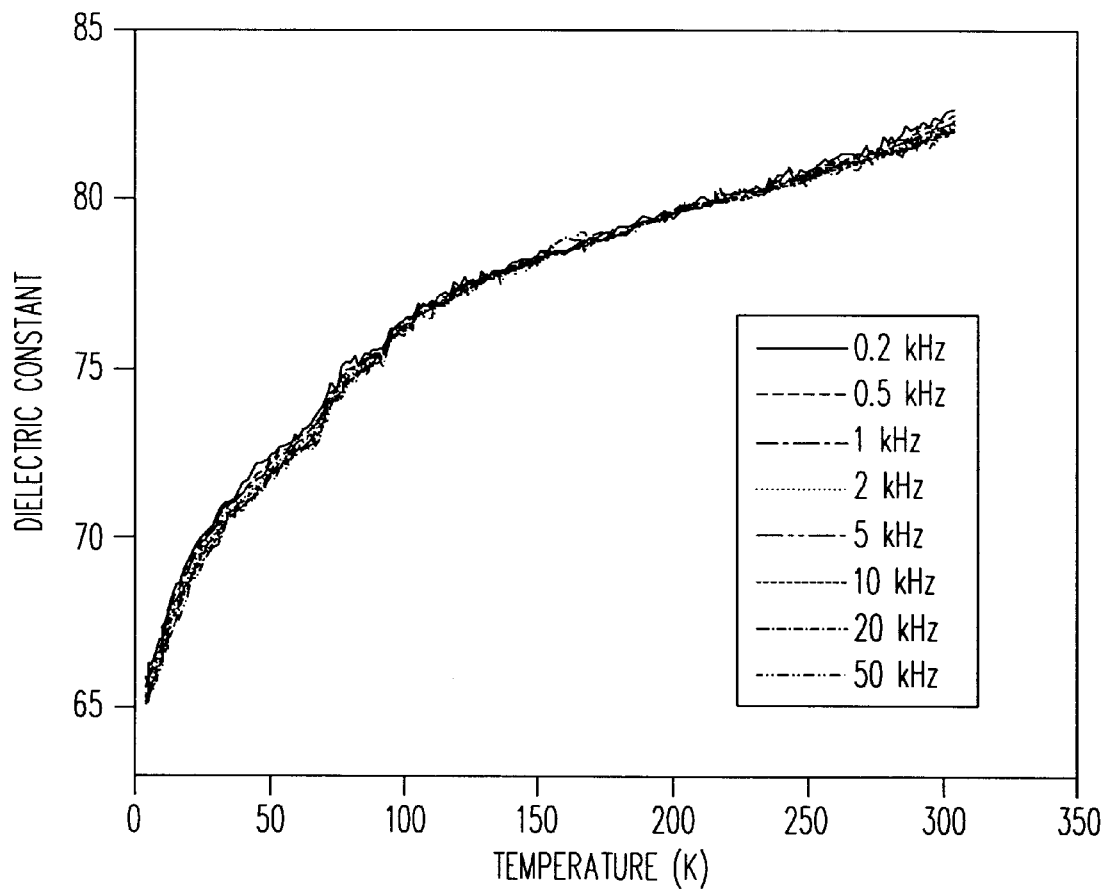
FIG. 14 shows the dielectric constant of $Bi_2(Zn_{1/3}Nb_{2/3})_2O_7$ films fired at 750° C. versus temperature.
Figure 15A:
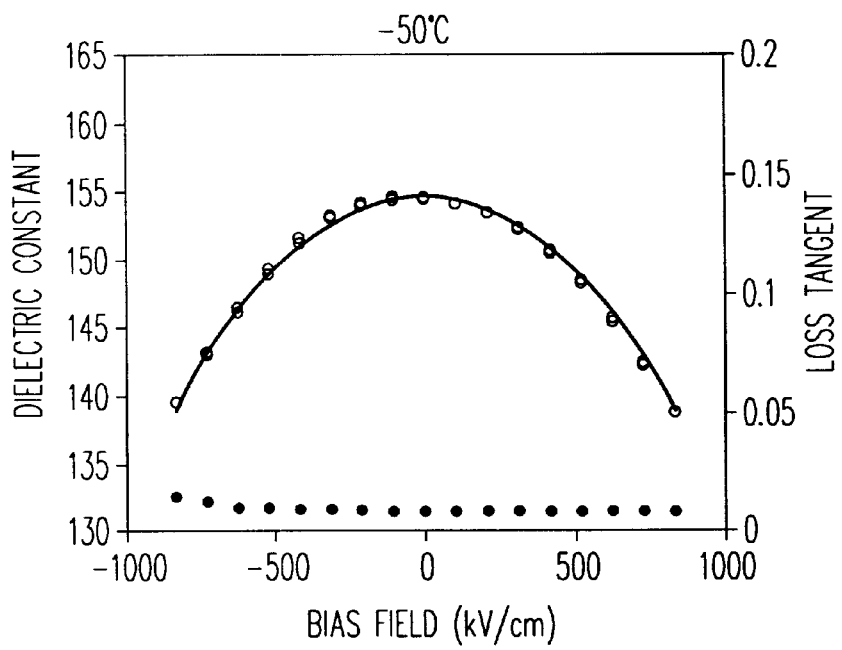
FIG. 15 shows bias field dependence of dielectric properties of $(Bi_{1.5}Zn_{0.5})(Zn_{0.5}Nb_{1.5})O_7$ films fired at 750° C. measured for temperatures of −50° C., −100° C., −130° C. and −170° C.
Figure 15B:
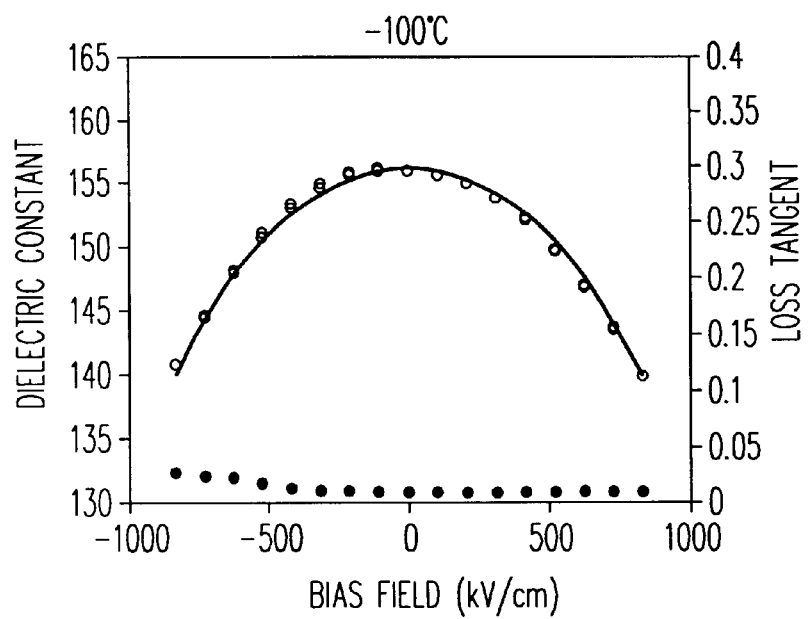
Figure 15C:
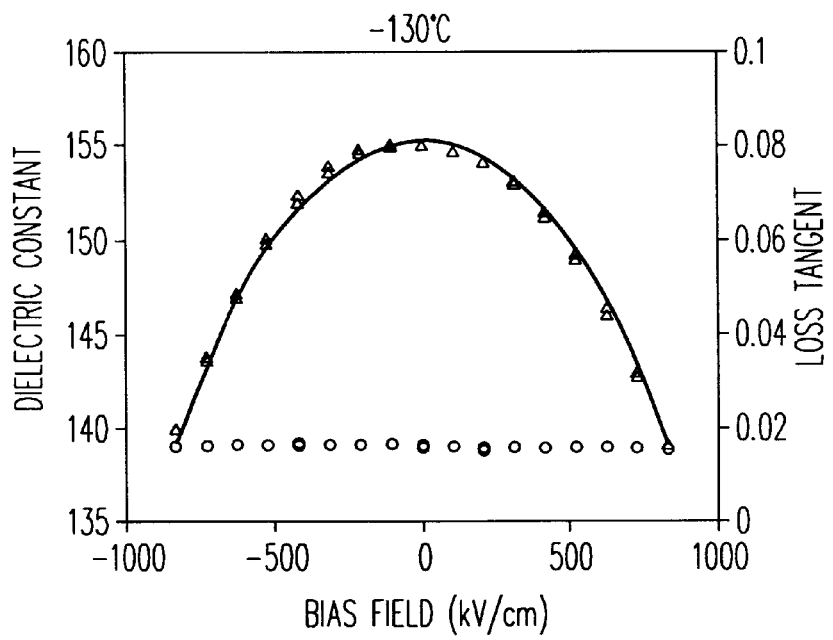
Figure 15D:
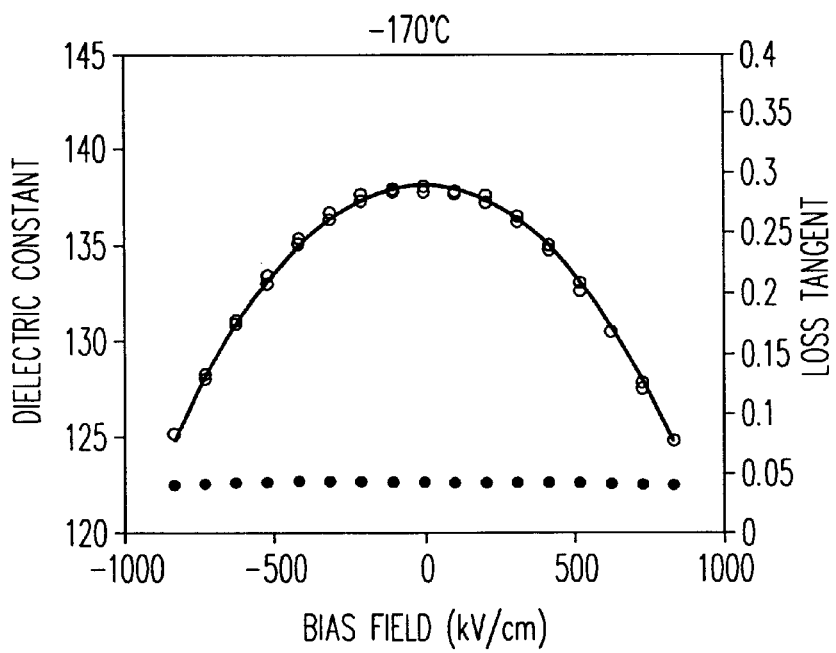

FIG. 14 shows the dielectric constant and loss of $Bi_2(Zn_{1/3}Nb_{2/3})_2O_7$ films fired at 750° C. versus temperature. The dielectric constant dropped rapidly below 100 K. No distinguished frequency dispersion was observed over the measured temperature range. The corresponding loss data showed no maxima.

FIG. 15 depicts the bias field dependence of dielectric properties of the $(Bi_{1.5}Zn_{0.5})(Zn_{0.5}Nb_{1.5})O_7$ films fired at 750° C. at the different measuring temperatures, i.e., at measured for temperatures of −50° C., −100° C., −130° C. and −170° C. It can be seen from that all films demonstrated the same fractional tunability throughout the temperature range.

Figure 16:
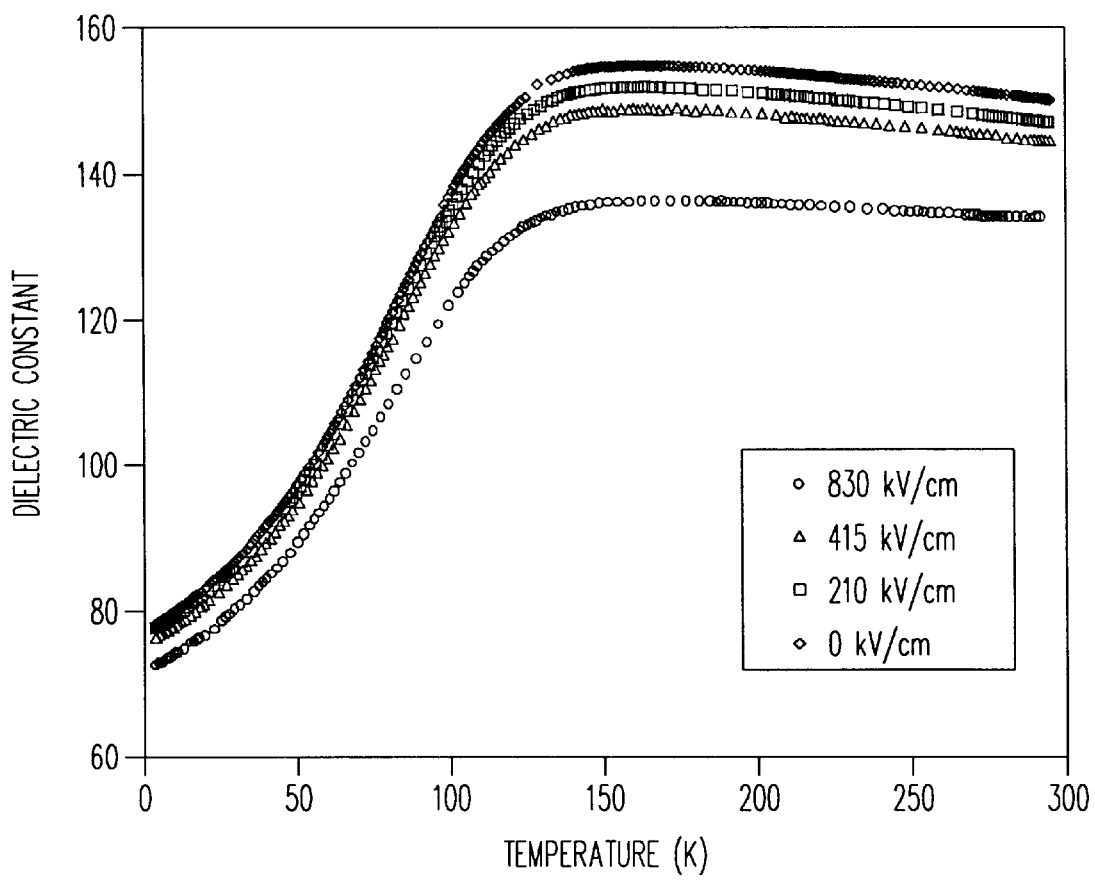
FIG. 16 illustrates the DC field dependence of the dielectric response of the $(B_{1.5}Zn_{0.5})(Zn_{0.5}Nb_{1.5})O_7$ films for bias levels of 0, 210, 415, and 830 kV/cm.

FIG. 16 shows the DC field dependence of the dielectric response of the $(Bi_{1.5}Zn_{0.5})(Zn_{0.5}Nb_{1.5})O_7$ films, studied for bias levels of 0, 210, 415, and 830 kV/cm. The loss tangents were nearly independent of the bias field. This indicates that the peak temperatures of loss tangent $T_{max}$ were bias field independent. It was found that in ferroelectric relaxors like PMN-PT, the bias field suppressed the frequency dispersion and increased $T_{max}$. It is believed that in relaxors, the large bias field destroys the glassy character and orders the local dipole field to establish a global equilibrium. The correlation length increased with field and could reach a macroscopic scale at large enough fields. The BZN films studied here clearly differ in this way from such relaxor ferroelectrics. The films still showed strong frequency dispersion even at fields as high as 830 kV/cm. Thus, it is believed that at this field, the dipoles still cannot establish a long-range ordering. This, in turn, suggests that the dipole-dipole interactions are weak in this system.

One of the main characteristics of spin glasses and relaxors is that their field cooled state are anisotropic, with behavior like normal ferromagnets or ferroelectrics. Thus, spin glasses and relaxors exhibit hysteresis at low temperatures when field cooled. However, in the BZN films, the data demonstrate that long-range ordering can not be established at the fields investigated, which prevents the formation of either ferroelectric or antiferroelectric states at low temperatures.

Figure 17:
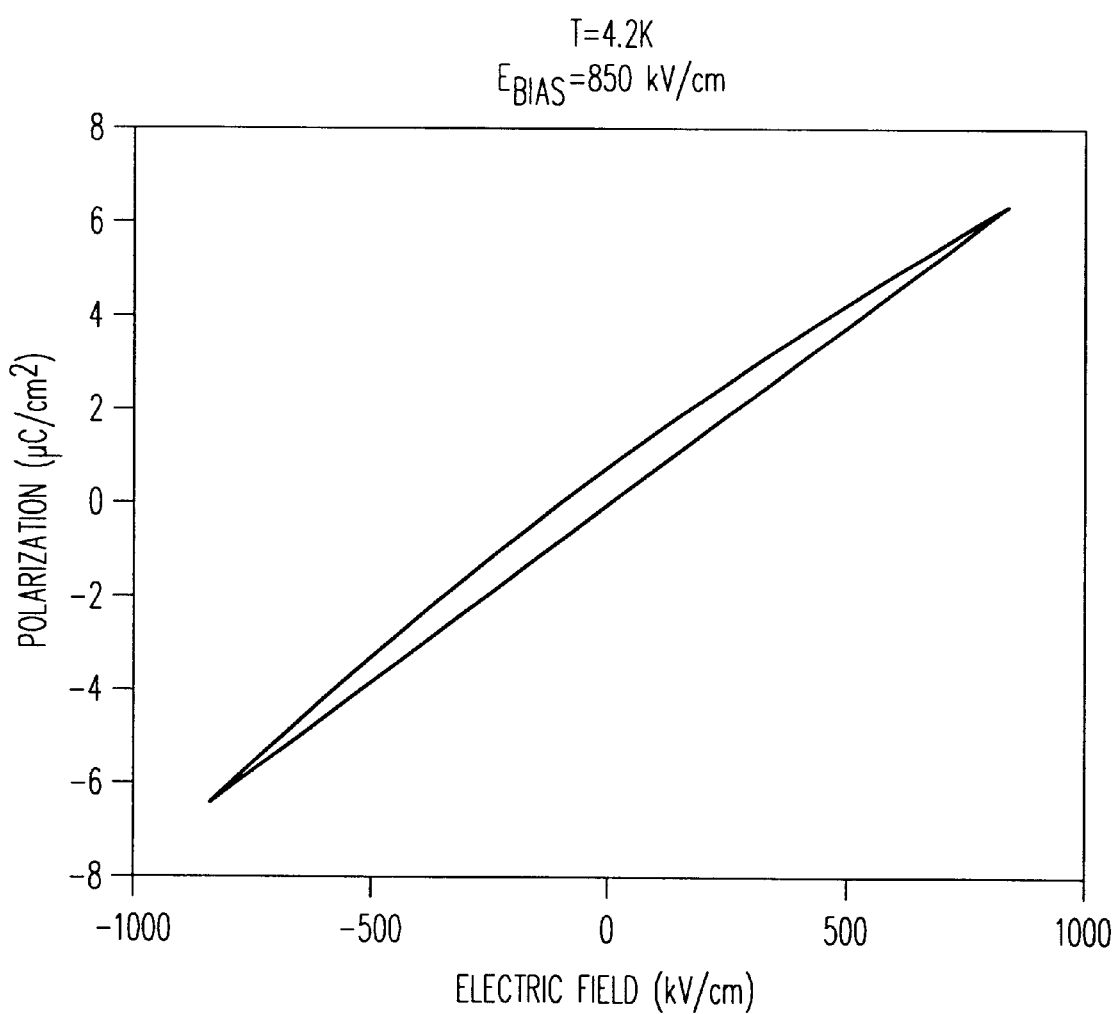
FIG. 17 shows the P-E loops of the BZN films measured at 4.2 K cooled under a bias field of 830 kV/cm.

FIG. 17 depicts the P-E loops of the BZN films measured at 4.2 K cooled under a bias field of 830 kV/cm. No hysteresis was observed in the BZN films. This result also suggests that a long range ordering of dipole moments can not be established at the low temperatures under field cooling for the conditions investigated.

The present invention further includes an article comprising a substrate and a thin film comprising a pyrochlore coated on the substrate. The pyrochlore is represented by the formula:

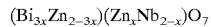
$$(Bi_{3x}Zn_{2-3x})(Zn_xNb_{2-x})O_7$$

wherein x is from about 0.45 to about 0.73, preferably x is from about 0.5 to about ⅔.

The substrate can be any inert material. As defined herein, an inert material is any material that does not react substantially with the film. Such materials include, but are not limited to, alumina, platinum coated alumina, indium-tin oxide, low temperature co-fire ceramic, strontium titanate, lanthanum nickelate or passivated silicon wafer. Preferably, the substrate is a platinum coated silicon wafer, such as $Pt/Ti/SiO_2/Si$.

The present invention also includes process for depositing on a substrate a thin film comprising a pyrochlore represented by the formula $(Bi_{3x}Zn_{2-3x})(Zn_xNb_{2-x})O_7$ wherein x is from about 0.5 to about ⅔. The process comprises scoating the substrate with a precursor composition comprising a bismuth containing metal organic compound such as a bismuth carboxylate, a zinc containing metal organic compound such as a zinc carboxylate and a niobium containing metal organic compound such as niobium alkoxide, an organic solvent, an organic acid and an organic base (step a), heating to remove organic components (step b) and annealing (step c) at a temperature and for a length of time sufficient to produce the pyrochiore thin film on the substrate.

The precursor composition is preferably prepared by mixing the zinc carboxylate with the organic solvent. The mixture produced is then heated to expel water and produce a dried mixture. A niobium alkoxide is then added to the dried mixture to produce a first solution. A second solution comprising bismuth carboxylate, organic base and organic acid is prepared. The first and second solutions are combined preferably by adding the second solution to the first solution. The precursor composition is obtained by heating.

A preferred example of bismuth carboxylate is bismuth acetate and a preferred example of the zinc carboxylate is zinc acetate dihydrate. However, other carboxylic acid salts can also be used. The niobium alkoxide is preferably niobium ethoxide. However, methoxide, propoxide, butoxide and the like can also be used. The organic solvent can be any suitable organic solvent that dissolves the organometallic precursors and is sufficiently volatile to be removed by heating Preferably, the organic solvent is methoxyethanol. Typically, acetic acid and pyridine are used as the organic acid and the organic base, respectively. However, other acids and bases can also be used.

Pyrochlore thin films according to the present invention can be obtained by solution coating. The coating step is typically carried out using spin-coating. However, other convenient coating methods known to those skilled in the art can also be used. To obtain the desired coating thickness, a single coating or multiple coatings may be applied to the substrate. Thus, one or more steps can be repeated. For example, the steps of coating the substrate with a precursor composition (step a) and heating to remove organic components (step b) may be repeated before carrying out the annealing step (step c). Alternatively, all three steps may be repeated.

Pyrochlore thin films according to the present invention can also be obtained by an alternative deposition method, such as, a vapor phase growth process, which includes sputtering, pulsed laser, MOCVD (Metal Organic Chemical Vapor Deposition) techniques and the like. Accordingly, the present invention includes a method of depositing on a substrate a thin film comprising a pyrochlore using one of these techniques. The method comprises: using a low temperature process comprising a step which can be sputtering, applying a pulsed laser or depositing by MOCVD (Metal Organic Chemical Vapor Deposition), wherein the step is carried out under conditions sufficient to produce the pyrochlore thin film on the substrate.

The thin film comprising a pyrochlore according to the present invention, including pyrochlores such as $(Bi_{1.5}Zn_{0.5})(Zn_{0.5}Nb_{1.5})O_7$ and $Bi_2(Zn_{1/3}Nb_{2/3})_2O_7$, has properties that include relatively large dielectric constants, small loss tangents, controllable temperature coefficients of capacitance and electric field tunability of the dielectric constant. These properties make the thin films of the present invention particularly suitable for use in dielectric applications, such as, capacitive components and decoupling capacitors as well as in microwave applications.

Preparation of Pyrochlore Thin Films by the MOD Process

Two compositions of pyrochlore thin films were prepared by the Metal Organic Deposition (MOD) process: $(Bi_{1.5}Zn_{0.5})(Zn_{0.5}Nb_{1.5})O_7$ and $Bi_2(Zn_{1/3}Nb_{2/3})_2O_7$. These two compositions are members of the general family $(Bi_{3x}Zn_{2-3x})(Zn_xNb_{2-x})O_7$, with x=0.5 and x=2/3, respectively.

The starting materials in the MOD (Metal Organic Deposition) process were bismuth acetate, zinc acetate dihydrate and niobium ethoxide (Aldrich Chemical Company, Inc., Milwaukee, Wis.). 2-methoxyethonal, pyridine and acetic acid (Aldrich, Chemical Company, Inc., Milwaukee, Wis.) were selected as solvents. Zinc acetate dihydrate was first mixed with 2-methoxyethanol and vacuum distilled at 110° C. to expel the water of hydration and to prevent niobium ethoxide from hydrolyzing. Niobium ethoxide was then added into the solution and refluxed at 120° C. for 1 h to form a (Zn, Nb) complex precursor, followed by vacuum distillation of by-products. The solution was cooled down below 80° C. In a separate flask, bismuth acetate was mixed with pyridine and stirred for 0.5 h. 30 percent by volume of acetic acid was added into the solution and stirred for 1 h until the solution became totally clear. The bismuth acetate solution was then added to the (Zn, Nb) precursor and the solution was refluxed at 120° C. for 0.5 h. After vacuum distilling off by-products, the final precursor solution was diluted using 2-methoxyethonal to a concentration of 0.3 M.

The precursor solution was spin coated on platinum-coated Si wafers Pt/Ti/SiO$_2$/Si (Nova Electronic Materials, Inc., Richardson, Tex.) at a speed of 3000 rpm for 30 s. The "as-deposited" films were pyrolyzed on a hot plate at a temperature of 350° C. for 1 min to remove the organics. The coating-pyrolysis procedure was repeated until the desired thickness was reached. The film was then crystallized in air using either a preheated tube furnace for 5 minutes or a rapid thermal annealer at a heating rate of 100° C./s and a soaking time of 60 s. The thickness of the films prepared was 0.05 μm to 1.5 μm.

Both the solutions and the resulting films were analyzed by several techniques. The thermal decomposition of BZN precursor gels was studied using a TA TGA2050 thermogravimetric analyzer and a TA DTA1600 differential thermal analyzer (TA Instruments, Inc., New Castle, Del.) at a heating rate of 10° C./min. The gels were formed by drying the precursor solutions at 120° C. for 24 h. The crystallinity of the BZN thin films was characterized with a Scintag DMC-105 X-ray diffractometer (Scintag, Inc., Sunnyvale, Calif.) using Cu K$_\alpha$ radiation. A Digital Instruments Dimension 3100 Atomic Force Microscope (AFM) (Digital Instruments, Santa Barbara, Calif.) was used in tapping mode to investigate the surface morphology and roughness of the thin films.

To examine the electrical properties, platinum dots of 0.5 mm or 1.5 mm in diameter were sputtered onto the films as top electrodes to form a Pt/BZN/Pt sandwich configuration. The dielectric properties of the BZN films were measured with a Hewlett Packard 4284A multi-frequency LCR meter with a test signal of 0.03 V rms at 10 kHz. For temperatures between 200 and −175° C., a computer-controlled Delta 9023 temperature oven (Delta Design, Inc., San Diego, Calif.) with a cooling ramp rate of 2° C./min was used. A second sample chamber was employed for measurements between 300 and 4 K, again with a cooling or heating ramp rate of 2° C./min. The measurement frequencies were between 20 Hz and 100 KHz. DC bias dependence measurements of dielectric properties were made using a DC bias voltage source provided by BP4284A LCR meter. P-E loops of the BZN films were measured by a RT66A ferroelectric test system (Radiant Technologies, Inc., Albuquerque, N. Mex.).

Alternative work-up and isolation procedures are also possible, and will be evident to those skilled in the art.

The present invention has been described with particular reference to the preferred embodiments. It should be understood that the foregoing descriptions and examples are only illustrative of the invention. Various alternatives and modifications thereof can be devised by those skilled in the art without departing from the spirit and scope of the present invention. Accordingly, the present invention is intended to embrace all such alternatives, modifications, and variations that fall within the scope of the appended claims.

What is claimed is:

1. A thin film comprising a pyrochlore represented by the formula:

$$(Bi_{3x}Zn_{2-3x})(Zn_xNb_{2-x})O_7$$

wherein x is from about 0.45 to about 0.73, wherein said thin film is tunable.

2. The thin film of claim 1, wherein x is from about 0.5 to about 2/3.

3. The thin film of claim 1, said pyrochlore being represented by the formula:

$$(Bi_{1.5}Zn_{0.5})(Zn_{0.5}Nb_{1.5})O_7.$$

4. The thin film of claim 1, said pyrochlore being represented by the formula:

$$Bi_2(Zn_{1/3}Nb_{2/3})_2O_7.$$

5. The thin film of claim 1, having a thickness from about 0.01 to about 10 μm.

6. The thin film of claim 5, having a thickness from about 0.03 to about 1.5 μm.

7. The thin film of claim 6, having a thickness from about 0.05 to about 0.5 μm.

8. The thin film of claim 1, having a phase selected from the group consisting of: cubic, pseudo-orthorombic and a combination thereof.

9. The thin film of claim 1, having a dielectric constant from about 50 to about 250.

10. The thin film of claim 1, having a loss tangent less than about 0.006 at 10 kHz.

11. The thin film of claim 1, having a temperature coefficient of capacitance (TCC) from about +300 to about −600 ppm/° C.

12. An article comprising:
   (1) a substrate; and
   (2) a thin film comprising a pyrochlore coated on said substrate, wherein said pyrochlore is represented by the formula:

$$(Bi_{3x}Zn_{2-3x})(Zn_xNb_{2-x})O_7$$

wherein x is from about 0.45 to about 0.73, wherein said thin film is tunable.

13. An article comprising:
   (1) a platinum coated substrate; and
   (2) a thin film comprising a pyrochlore coated on said substrate, wherein said pyrochlore is represented by the formula:

$$(Bi_{3x}Zn_{2-3x})(Zn_xNb_{2-x})O_7$$

wherein x is from about 0.45 to about 0.73, wherein said thin film is tunable.

14. The article of claim 13, wherein x is from about 0.5 to about ⅔.

15. The article of claim 13, wherein said substrate is an inert substrate.

16. The article of claim 13, wherein said platinum coated substrate is selected from the group consisting of platinum coated alumina, indium-tin oxide, low temperature low-fire ceramic, strontium titanate, lanthanum nickelate and passivated silicon wafer.

17. An article comprising:
   (1) a platinum coated silicon wafer substrate; and
   (2) a thin film comprising a pyrochlore coated on said substrate, wherein said pyrochlore is represented by the formula:

$$(Bi_{3x}Zn_{2-3x})(Zn_xNb_{2-x})O_7$$

wherein x is from about 0.45 to about 0.73, wherein said thin film is tunable.

18. An article comprising:
   (1) a platinum coated silicon wafer substrate which is Pt/Ti/SiO$_2$/Si; and (2) a thin film comprising a pyrochlore coated on said substrate, wherein said pyrochlore is represented by the formula:

$$(Bi_{3x}Zn_{2-3x})(Zn_xNb_{2-x})O_7$$

wherein x is from about 0.45 to about 0.73, wherein said thin film is tunable.

19. A thin film comprising a pyrochlore having an electric field tunable dielectric constant, said pyrochlore being represented by the formula:

$$(Bi_{3x}Zn_{2-3x})(Zn_xNb_{2-x})O_7$$

wherein x is from about 0.45 to about 0.73; and wherein said pyrochlore is prepared by a process comprising the steps of:
   (a) coating a substrate with a precursor composition comprising a bismuth containing metal organic compound, a zinc containing metal organic compound and a niobium containing metal organic compound, an organic solvent, an organic acid and an organic base;
   (b) heating to remove organic components; and
   (c) annealing at a temperature and for a length of time sufficient to produce said pyrochlore thin film.

20. A thin film comprising a pyrochlore represented by the formula:

$$(Bi_{3x}Zn_{2-3x})(Zn_xNb_{2-x})O_7$$

wherein x is from about 0.45 to about 0.73, said pyrochlore having an electric field tunable dielectric constant, wherein said pyrochlore is prepared by a method comprising using a low temperature process for depositing a thin film on a substrate comprising a step selected from the group consisting of: sputtering, applying a pulsed laser and depositing by metal organic chemical vapor deposition, wherein said step is carried out under conditions sufficient to produce said thin film comprising pyrochlore.

21. An article comprising:
   (1) a substrate selected from the group consisting of: alumina, indium-tin oxide, low temperature low-fire ceramic, strontium titanate and lanthanum nickelate; and
   (2) a thin film comprising a pyrochlore coated on said substrate, wherein said pyrochlore is represented by the formula:

$$(Bi_{3x}Zn_{2-3x})(Zn_xNb_{2-x})O_7$$

wherein x is from about 0.45 to about 0.73.

22. An article comprising:
   (1) a metal coated substrate; and
   (2) a thin film comprising a pyrochlore coated on said metal coated substrate, wherein said pyrochlore is represented by the formula:

$$(Bi_{3x}Zn_{2-3x})(Zn_xNb_{2-x})O_7$$

wherein x is from about 0.45 to about 0.73.

23. The article of claim 22, wherein said substrate is selected from the group consisting of: indiumin oxide, lanthanum nickelate, alumina, low temperature low-fire ceramic, strontium titanate and passivated silicon wafer.

24. An article comprising:
   (1) a platinum coated substrate; and (2) a thin film comprising a pyrochlore coated on said platinum coated substrate, wherein said pyrochlore is represented by the formula:

$$(Bi_{3x}Zn_{2-3x})(Zn_xNb_{2-x})O_7$$

wherein x is from about 0.45 to about 0.73.

25. The article of claim 24, wherein x is from about 0.5 to about ⅔.

26. The article of claim 24, wherein said pyrochlore is represented by the formula:

$$(Bi_{1.5}Zn_{0.5})(Zn_{0.5}Nb_{1.5})O_7.$$

27. The article of claim 24, wherein said pyrochlore is represented by the formula:

$$Bi_2(Zn_{1/3}Nb_{2/3})_2O_7.$$

28. The article of claim 24, wherein said thin film has a thickness from about 0.01 to about 10 μm.

29. The article of claim 27, wherein said thin film has a thickness from about 0.03 to about 1.5 μm.

30. The article of claim 29, wherein said thin film has a thickness from about 0.05 to about 0.5 μm.

31. The article of claim 24, wherein said thin film has a phase selected from the group consisting of: cubic, pseudo-orthorombic and a combination thereof.

32. The article of claim 24, wherein said thin film has a dielectric constant from about 50 to about 250.

33. The article of claim 24, wherein said thin film has a loss tangent less than about 0.006 at 10 kHz.

34. A The article of claim 24, wherein said thin film has a temperature coefficient of capacitance (TCC) from about +300 to about −600 ppm/° C.

35. The article of claim 24, wherein said thin film is tunable.

36. The article of claim 24, wherein said substrate is an inert substrate.

37. The article of claim 24, wherein said substrate is selected from the group consisting of alumina, indium-tin oxide, low temperature low-fire ceramic, strontium titanate, lanthanum nickelate and passivated silicon wafer.

38. The article of claim 24, wherein said platinum coated substrate is a platinum coated silicon wafer.

39. The article of claim 38, wherein said platinum coated silicon wafer is Pt/Ti,SiO$_2$/Si.

40. A method of depositing on a substrate a thin film comprising a pyrochlore represented by the formula:

$$(Bi_{3x}Zn_{2-3x})(Zn_xNb_{2-x})O_7$$

wherein x is from about 0.45 to about 0.73, said pyrochlore having an electric field tunable dielectric constant, said method comprising using a low temperature process for depositing a thin film on a substrate comprising a step selected from the group consisting of: sputtering, applying a pulsed laser and depositing by metal organic chemical vapor deposition, wherein said step is carried out under conditions sufficient to produce said thin film comprising pyrochlore.

* * * * *